United States Patent [19]
Nimke et al.

[11] Patent Number: 4,465,309
[45] Date of Patent: Aug. 14, 1984

[54] CONNECTING OR REPAIR DEVICE

[75] Inventors: Helmut E. Nimke, Tuxedo, N.Y.; William R. Thomas, Malvern, Pa.

[73] Assignees: UMAC, Inc., Paoli, Pa.; Brooklyn Union Gas Company, Brooklyn, N.Y.; a part interest

[21] Appl. No.: 292,455

[22] Filed: Aug. 13, 1981

[51] Int. Cl.³ .............................................. F16L 21/06
[52] U.S. Cl. .................................... 285/373; 285/381; 285/DIG. 16; 138/99; 228/152
[58] Field of Search ................ 285/21, DIG. 16, 419, 285/373, 287, 3, 381; 138/99; 339/275 R, 275 T; 228/152, 144, 149

[56] References Cited
U.S. PATENT DOCUMENTS

| | | | |
|---|---|---|---|
| 1,731,991 | 10/1929 | Tracy | 285/293 X |
| 3,154,330 | 10/1964 | Clark et al. | 285/419 |
| 3,229,998 | 1/1966 | Pennington | 285/419 |
| 3,329,740 | 7/1967 | Battersby | 228/144 X |
| 3,415,287 | 12/1968 | Heslop et al. | 285/DIG. 16 X |
| 3,649,055 | 3/1972 | Nilsen | 285/21 X |
| 3,689,114 | 9/1972 | Meserole | 285/21 X |
| 3,770,556 | 11/1973 | Evans et al. | 285/381 X |
| 3,913,444 | 10/1975 | Otte | 29/447 |
| 4,092,193 | 5/1978 | Brooks . | |
| 4,338,970 | 7/1982 | Krackeler et al. | 29/450 X |

FOREIGN PATENT DOCUMENTS 1026000  4/1966  United Kingdom ................ 285/197

Primary Examiner—Thomas F. Callaghan
Attorney, Agent, or Firm—Michael F. Petock

[57] ABSTRACT

A device is provided for connecting together the ends of pipes or tubing or for repairing a fault in a pipe or tubing. The device is comprised of a resilient sheet member in the form of a coil having a layer of heat sensitive bonding material applied to the inner surface of the resilient sheet member. The resilient sheet member coil is formed to an inner diameter slightly less than the outer diameter of the pipe or tubing. In the case where the resilient sheet member is used as a connector, the resilient sheet member is sprung to a diameter larger than the outer diameter of the pipe or tubing and retained in this expanded form by a heat sensitive material which melts upon being heated to allow contraction of the connector. At the same time, the heat sensitive bonding material forms a tight bond to the two ends of the pipes or tubing to be connected. Where the device is utilized as a repair device, the ends of the resilient sheet member are adapted to be sprung apart so that the device may be mounted over the pipe or tubing at the position of the fault. Once mounted in position, the resilient member springs back to its original condition applying an inward force to the outer diameter of the pipe or tubing. Upon heating, the heat sensitive material melts to form a tight bond to the pipe and at least partially fills the fault in the pipe or tubing.

15 Claims, 5 Drawing Figures

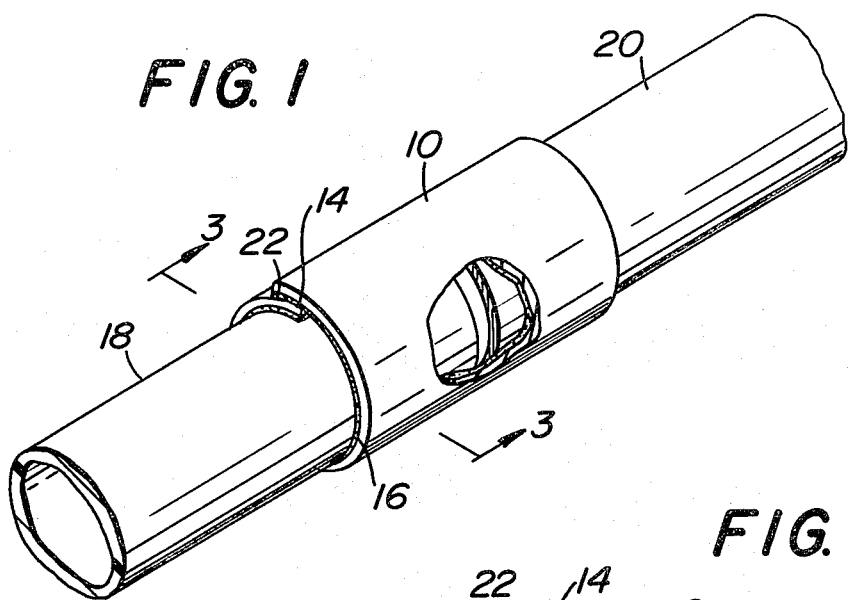
FIG. 1
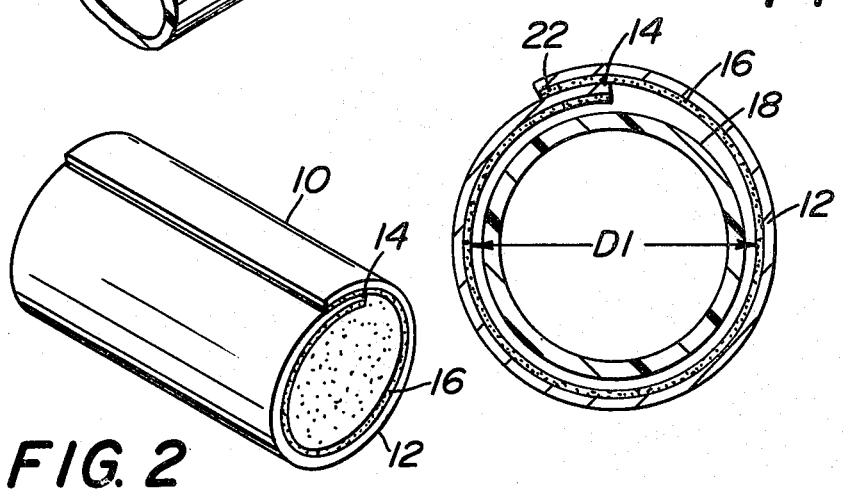
FIG. 2
FIG. 3
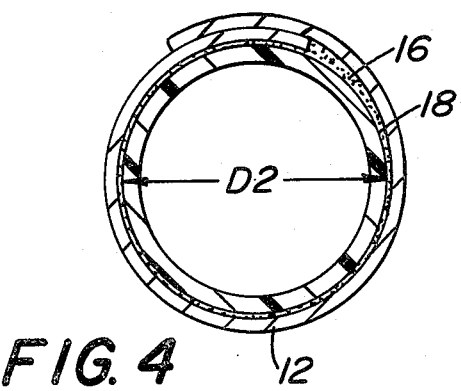
FIG. 4
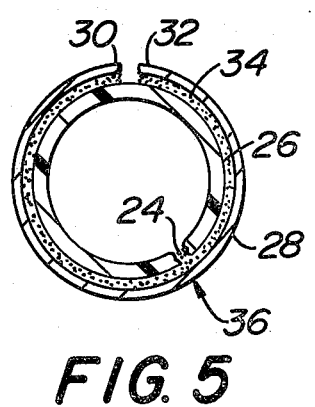
FIG. 5

CONNECTING OR REPAIR DEVICE

BACKGROUND OF THE INVENTION

The present invention relates to a device to be used as a connector or a repair device for pipe or tubing. More particularly, the present invention relates to a device which utilizes a resilient sheet member which applies an inwardly contracting force on the exterior surface of the pipe or tubing.

There has been a need in the past for a cost effective, efficient and rapid means of connecting together pipe or tubing and for the repairing of faults or holes in such pipe or tubing without the necessity of cutting or dividing the pipe or tubing. There has been a need in the past for a connector which does not require the insertion of an inner supporting member within the pipe or tubing to be connected together or repaired. Furthermore, there has been a desire to provide a strong adhesive bond between the connector and the pipe or tubing to be bonded together or repaired.

The present invention provides advantages directed to providing solutions to these needs.

SUMMARY OF THE INVENTION

The present invention enables the connecting together of ends of pipes or tubing or a repair of flaws in pipes or tubing. The present invention may be utilized for the connecting together or the repair of pipes, tubing or other similar structures, including metallic and both flexible and rigid plastic or synthetic tubing. However, hereinafter throughout, the word tubing will be utilized to signify any and all such structures. The present invention provides a rapid and efficient manner of connection or repair which provides a mechanical contracting force on the outer surface of the tubing to enhance the adhesive bonding between the device and the tubing and to help maintain the bond.

Briefly, in accordance with the present invention, a device for connecting together the ends of tubing is provided. The device is comprised of a resilient sheet member in the form of a coil having at least partially overlapping surfaces. The inner diameter of the resilient sheet member coil is less than the outer diameters of the tubing to be joined. A heat sensitive bonding material is applied to the inner surface of the sheet member coil. The sheet member coil is expanded to a larger inner diameter against a resiliently inwardly directed force of the resilient sheet member and held in the expanded condition by heat sensitive material. The expanded larger inner diameter of the sheet member coil is of a diameter sufficient to receive the tubing therein. In use, the two ends of tubing to be connected together are inserted into the device. The device is heated wherein the heat sensitive material holding the device in its expanded condition melts allowing the resilient sheet member to contract tightly against the outer surface of the tubing. At the same time, the heat sensitive bonding material on the inner surface of the resilient sheet member has been melted by the heat and forms a tight bond between the inner surface of the sheet member and the tubing to be joined. The contracting force of the resilient sheet member coil provides additional support for the bond between the resilient sheet member and the tubing.

The resilient sheet member may be comprised of a metal such as stainless steel, brass, bronze, spring steel or other similar resilient metal. The heat sensitive bonding material may be any one of a number of suitable thermoplastic adhesives. This heat sensitive bonding material may be utilized to hold the resilient sheet member coil to the expanded diameter, or in the case of brass, bronze or the like, a bead of solder may be used for this purpose. The resilient sheet member coil may be comprised of a resilient plastic material such as polyethylene, polyolefin, vinyl or other suitable resilient plastic material.

In accordance with the present invention, the device of the present invention may be utilized for repairing a fault in tubing. A resilient sheet member is provided in the form of a coil with an inner diameter less than the outer diameter of the tubing to be repaired. A heat sensitive bonding material is applied to the inner surface of the sheet member coil. The resilient sheet member with a first and second free end is spreadable against the resilient force of the resilient sheet to enable mounting of the resilient sheet member coil over the tubing to be repaired. The resilient sheet member coil is heated causing the layer of heat sensitive bonding material to bind to the outer surface of the tubing and to at least partially fill the fault in the tubing, whereby repair of the fault in the tubing may be effected. The same structural material may be utilized in the device for both connecting and repairing tubing.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 1 is a view in perspective of a connecting device in accordance with the present invention, with the connecting device being partially broken away to illustrate the abutting ends of the tubing with an exaggerated spacing therebetween.

FIG. 2 is a view in perspective of a connector device in accordance with the present invention in the expanded state before being heated.

FIG. 3 is a cross-sectional view taken along line 3—3 of FIG. 1.

FIG. 4 is a cross-sectional view equivalent to the location of line 3—3 after application of heat to the connecting device illustrating it in the contracted state and after the formation of a bond.

FIG. 5 is a cross-sectional view illustrating a device in accordance with the present invention utilized in the repair of a fault in tubing.

DETAILED DESCRIPTION OF THE PREFERRED EMBODIMENTS

Referring now to the drawings in detail, wherein like numerals indicate like elements, there is shown in FIG. 2 a connecting device 10 in accordance with the present invention. Connecting device 10 is comprised of a resilient sheet member 12 in the form of a coil. Resilient sheet member 12 has overlapping surfaces at 14. In other words, the resilient sheet member 12 has at least partially overlapping surfaces which may form a bonding area between the two ends of the resilient sheet member. Heat sensitive bonding material 16 is applied to the inner surface of sheet member coil 12. The heat sensitive bonding material may be any suitable type of heat sensitive bonding material, including, but not limited to, various ethylene vinyl acetate resins or a commercially available adhesive manufactured by the Bostik Company of Middleton, Mass. and sold under the name BOSTIK 6323. Resilient sheet member 12 may be comprised of any suitable resilient metal or synthetic plastic material. Suitable resilient metal sheet material may be stainless steel, brass, bronze, spring steel or other suitable resilient metallic material. Suitable resilient synthetic plastic material may be polyethylene, polyolefin, vinyl or other suitable synthetic materials having the desired resiliency.

Resilient sheet member coil 12 is formed or constructed to have an unstressed or resting diameter less than the tubing 18 to be connected or joined. In other words, the inner diameter of connecting device 10 is less than the outer diameter of tubing 18 to be connected. In constructing connecting device 10, resilient sheet member 12 is expanded to a larger inner diameter against the resiliently inwardly directed force of sheet member 12. This larger inner diameter is shown as D1 in FIG. 3. Connecting device 10 is retained in the form of an expanded diameter by means of the adhesive between the overlapping surfaces shown at 14 or by means of a separate heat sensitive material, such as a solder bead 22, shown in FIGS. 1 and 3. One advantage of a separate heat sensitive material, such as solder bead 22, is the ability to control the sequence of the contraction of resilient sheet member coil 12 and the melting of heat sensitive bonding material 16. For example, it may be desirable to allow the heat sensitive material 22 to melt first to allow the resilient sheet member coil 12 to contract prior to the melting of heat sensitive bonding material 16, thereby ensuring that heat sensitive bonding material 16 is in contact with the tubing when it melts.

In use, the ends of tubing 18 and 20 to be joined are inserted into connecting device 10. In the expanded form of connecting device 10, the ends of tubing 18 and 20 are easily inserted. Preferably, the ends of the tubing 18 and 20 would abut each other substantially in the center of connecting device 10. A space is shown in FIG. 1 between the two ends merely for ease in illustrating the two pieces of tubing coming together. However, it is not essential that the two pieces of tubing abut each other or that they meet in the center of connecting device 10. As stated above, tubing 18 and 20 being connected together may be any type of a flexible or rigid synthetic plastic tubing or rigid metallic pipe or tubing. However, throughout the description hereof, all such cylindrical members will be referred to as tubing. As shown in FIG. 3, the tubing being joined is a synthetic plastic material.

Upon application of heat to resilient sheet member 12, the heat sensitive material 16 and/or 22 at area 14 retaining resilient sheet member 12 in the expanded diameter is caused to melt. Upon melting of the material 16 and/or 22 at area 14, the resilient sheet member 12 contracts to a smaller diameter D2 as shown in FIG. 4. At the same time, the heat applied to resilient sheet member 12 causes the melting of heat sensitive bonding material 16. The contraction of resilient sheet member 12 and heat sensitive bonding material 16 forms a tight bond between the connector 10 and the tubing. The force applied by the contracted resilient sheet member 12 provides strength to the bond formed between connector 10 and the tubing not only in providing reinforcement at the joint, but by maintaining an inwardly directed force on the bond between resilient sheet member 12 and the outer surface of the tubing as shown in FIG. 4.

In another embodiment of the present invention shown in FIG. 5, a device in accordance with the present invention may be utilized to repair a fault 24 in tubing 26. As shown in FIG. 5, a resilient sheet member 28 is provided. Resilient sheet member 28 may be constructed of the same or similar material as resilient sheet member 12. However, resilient sheet member 28 is coiled so as to provide a first free end 30 and a second free end 32 without overlapping structure. The inner surface of resilient sheet member 28 is provided with a heat sensitive bonding material 34 similar to heat sensitive bonding material 16.

In use, repair device 36 may be mounted over tubing 26 containing a fault 24, such as a hole, by spreading apart the free ends 30 and 32 to enable the mounting of the resilient sheet member 28 over the tubing 26. Once mounted, the resilient sheet member 28 is heated causing the heat sensitive bonding material to melt forming a tight bond between resilient sheet member 28 and the outer surface of tubing 26. Preferably, the heat sensitive bonding material 26 at least partially fills the fault 24. The resilient sheet member coil 28 is preferably provided with an initial inner diameter less than the outer diameter of the tubing to be repaired so that an inwardly directed force is provided on the bond between the inner surface of resilient sheet member 28 and the outer surface of tubing 26. This inwardly directed force provides additional strength to this bond.

The present invention may be embodied in other specific forms without departing from the spirit or essential attributes thereof and, accordingly, reference should be made to the appended claims, rather than to the foregoing specification as indicating the scope of the invention.

We claim:

1. A device for connecting together ends of pipes or tubing, comprising:
   a resilient sheet member in the form of a coil having at least partially overlapping surfaces, the inner diameter of said sheet member coil being less than the outer diameters of the pipes or tubing to be joined;
   a heat sensitive adhesive bonding material applied to the inner surface of said sheet member coil; and
   said sheet member coil being expanded to a larger inner diameter against a resiliently inwardly directed force of said sheet member and held in said expanded condition by said heat sensitive adhesive bonding material between and bonded to said partially overlapping surfaces of said coil, the expanded larger inner diameter being of a sufficient diameter to receive the ends of said pipes or said tubing to be joined, whereby said ends may be easily inserted into said coiled sheet member, said coiled sheet member being heatable whereby said heat sensitive adhesive bonding material melts allowing said sheet member to contract inwardly forming a tight bond between the inner surface of said sheet member and said pipes or tubing to be joined to form a strong bond upon cooling of said heat sensitive adhesive bonding material with said resilient sheet member coil providing support.

2. A device in accordance with claim 1 wherein said resilient sheet member is comprised of a metal.

3. A device in accordance with claim 2 wherein said metal is stainless steel.

4. A device in accordance with claim 2 wherein said metal is selected from the group consisting of stainless steel, brass, bronze and spring steel.

5. A device in accordance with claim 1 wherein said resilient sheet member is comprised of a resilient plastic material.

6. A device in accordance with claim 5 wherein said plastic material is selected from the group consisting of polyethylene, polyolefin and vinyl.

7. A device in accordance with claim 1 wherein said heat sensitive bonding material is comprised of a thermoplastic material.

8. A device in accordance with claim 1 wherein said heat sensitive bonding material is a thermoplastic material for bonding to the pipe or tubing to be joined and wherein said resilient sheet member is comprised of a metal and a bead of solder is provided to retain said resilient sheet metal coil in its expanded condition.

9. A device for repairing a fault in a pipe or tubing, comprising:
 a resilient sheet member in the form of a coil having at least partially overlapping surfaces, the inner diameter of said sheet member coil being less than the outer diameter of the pipe or tubing to be repaired;
 a heat sensitive adhesive bonding material being applied to the inner surface of said sheet member coil; and
 said resilient sheet member coil being expanded to a larger inner diameter against a resiliently inwardly directed force of said sheet member coil to enable the mounting of said sheet member coil over a pipe or tubing having a fault, said resilient sheet member being held in the expanded condition by said heat sensitive adhesive bonding material between and bonded to said partially overlapping surfaces of said coil whereby said sheet member and heat sensitive bonding material may be heated to cause said heat sensitive adhesive bonding material to melt allowing said resilient sheet member to contract to its unexpanded condition and forming a bond between the inner surface of said resilient sheet member and the outer surface of said pipe or tubing and at least partially filling the fault in said pipe or tubing whereby repair of the fault in the pipe or tubing may be effected.

10. A device in accordance with claim 9 wherein said resilient sheet member is comprised of a metal.

11. A device in accordance with claim 10 wherein said metal is stainless steel.

12. A device in accordance with claim 10 wherein said metal is selected from the group consisting of stainless steel, brass, bronze and spring steel.

13. A device in accordance with claim 9 wherein said resilient sheet member is comprised of a resilient plastic material.

14. A device in accordance with claim 13 wherein said plastic material is selected from the group consisting of polyethylene, polyolefin and vinyl.

15. A device in accordance with claim 9 wherein said heat sensitive adhesive bonding material is comprised of thermoplastic material.

* * * * *